US010050426B2

(12) United States Patent
Sano et al.

(10) Patent No.: US 10,050,426 B2
(45) Date of Patent: Aug. 14, 2018

(54) CABLE ROUTING STRUCTURE

(71) Applicant: Yazaki Corporation, Minato-ku, Tokyo (JP)

(72) Inventors: Hikaru Sano, Susono (JP); Akira Tsubaki, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/479,446

(22) Filed: Apr. 5, 2017

(65) Prior Publication Data

US 2017/0294767 A1    Oct. 12, 2017

(30) Foreign Application Priority Data

Apr. 6, 2016   (JP) ................................. 2016-076827

(51) Int. Cl.
| | |
|---|---|
| *H01B 7/00* | (2006.01) |
| *H02G 3/04* | (2006.01) |
| *H02G 3/08* | (2006.01) |
| *B60R 16/02* | (2006.01) |
| *H01B 7/08* | (2006.01) |
| *H02G 3/18* | (2006.01) |
| *H02G 11/00* | (2006.01) |
| *H02G 11/02* | (2006.01) |

(52) U.S. Cl.
CPC ......... *H02G 3/083* (2013.01); *B60R 16/0215* (2013.01); *H01B 7/08* (2013.01); *H02G 3/0406* (2013.01); *H02G 3/0437* (2013.01); *H02G 3/0462* (2013.01); *H02G 3/18* (2013.01); *H02G 11/006* (2013.01); *H02G 11/02* (2013.01)

(58) Field of Classification Search
CPC ........ H02G 3/04; H02G 3/0437; H02G 11/00; H02G 11/006; B60N 2/0224; H01B 7/0853; H01B 7/0846; H01B 7/041; B60R 16/0215
See application file for complete search history.

(56) References Cited

U.S. PATENT DOCUMENTS

| | | | | |
|---|---|---|---|---|
| 7,265,295 | B2 * | 9/2007 | Kogure | ............... B60R 16/0207 174/135 |
| 7,516,917 | B2 * | 4/2009 | Rubenstein | .......... G02B 6/4439 242/417.3 |
| 2001/0052442 | A1 * | 12/2001 | Tsukamoto | ......... B60R 16/0215 191/12 R |
| 2004/0056926 | A1 * | 3/2004 | Samoto | .................... B41J 29/02 347/50 |
| 2006/0257093 | A1 * | 11/2006 | Shibata | ............ G01R 31/31905 385/135 |

(Continued)

FOREIGN PATENT DOCUMENTS

JP    2004-328985 A    11/2004

*Primary Examiner* — Chau N Nguyen
*Assistant Examiner* — Roshn Varghese
(74) *Attorney, Agent, or Firm* — Sughrue Mion, PLLC (57) ABSTRACT

A cable routing structure includes a plurality of cables that are superposed on one another and that are movable relatively to one another in length directions thereof, and a line length difference housing case that contains parts of the plurality of cables and is movable in a reciprocating direction. The line length difference housing case absorbs differences in line length among the plurality of cables generated in accordance with a moving position of the line length difference housing case.

11 Claims, 10 Drawing Sheets

(56) References Cited

U.S. PATENT DOCUMENTS

2006/0292923 A1\* 12/2006 Tsukamoto ......... B60R 16/0215
                                                    439/501
2009/0044455 A1\*  2/2009 Enomoto ............ B60R 16/0207
                                                     49/360

\* cited by examiner

CABLE ROUTING STRUCTURE

CROSS REFERENCE TO RELATED APPLICATIONS

This application is based on Japanese Patent Application (No. 2016-076827) filed on Apr. 6, 2016, the contents of which are incorporated herein by reference.

BACKGROUND OF THE INVENTION

1. Field of the Invention

The present invention relates to a cable routing structure.

2. Description of the Related Art

For example, in a cable routing structure known in a vehicle such as a car, moving-body-side devices such as slide seats, slide doors, etc. and vehicle-body-side devices such as controllers are connected through a plurality of flat cables so that control signals can be transmitted through the flat cables or electric power can be supplied through the flat cables (for example, see JP-A-2004-328985). The cable routing structure includes the flat cables having one ends which are connected to a moving body, and a winding unit provided at the other ends of the flat cables opposite to the one ends of the flat cables. The winding unit takes up the flat cables drawn out by sliding of the moving body.

Figure 10:
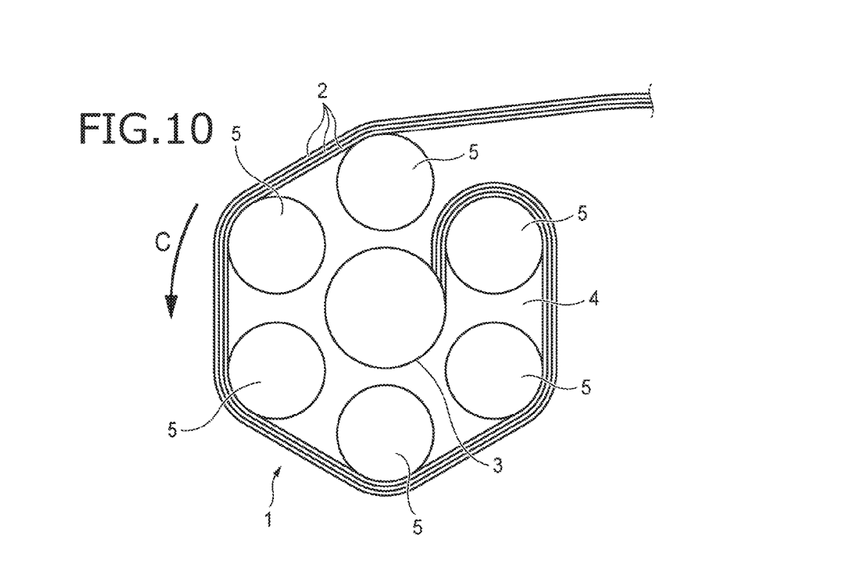
FIG. 10 is a schematic plan view showing an internal configuration of the winding unit.

As shown in FIG. 10, a winding unit 1 has a central shaft portion 3, a rotor 4, a plurality of rollers 5, and an urging unit such as a spring. End portions of a plurality of flat cables 2 placed on one another are fixed to the central shaft portion 3. The rotor 4 is rotatably provided around the central shaft portion 3. The rollers 5 are rotatably disposed on the rotor 4 and around the central shaft portion 3. The urging unit urges the rotor 4 in one winding direction C. In the winding unit 1, the rotor 4 is rotated by the urging unit so that the flat cables 2 can be taken up along the rollers 5.

Figure 11:
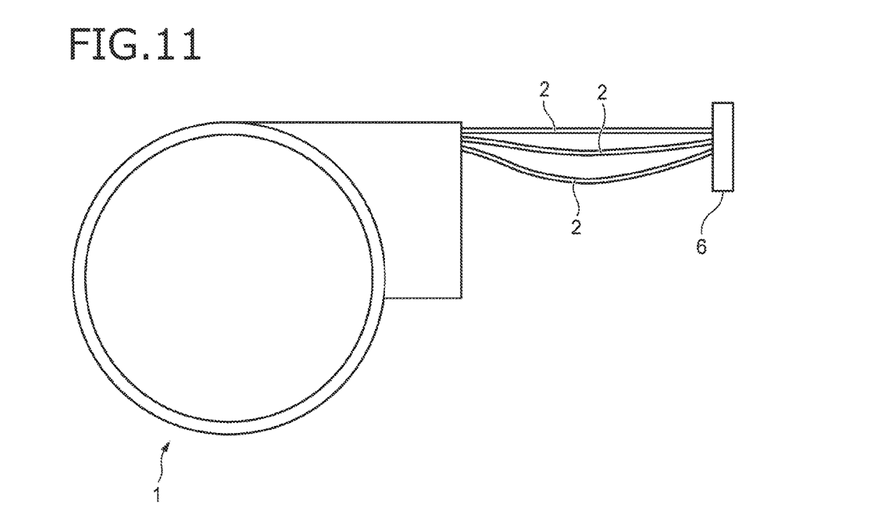
FIG. 11 is a schematic view for explaining loosening of flat cables drawn out from the winding unit.

Among the flat cables 2 wound up along the rollers 5, inner cable is set in a more straight shape while more loosening occurs in outer cable. Thus, as shown in FIG. 11, loosening occurs in the flat cables 2 between the winding unit 1 and a moving body 6 due to differences in line length among the flat cables 2. There is a fear that loosened parts of the flat cables 2 occurs interference with a peripheral structure.

SUMMARY OF THE INVENTION

The present invention has been developed in consideration of the aforementioned situation. An object of the invention is to provide a cable routing structure capable of suppressing loosening of flat cables, and capable of making the flat cables follow a moving body to thereby feed out and take up the flat cables smoothly.

In order to attain the foregoing object, a cable routing structure according to the invention is characterized by the following configurations (1) to (12).

(1) A cable routing structure including:
a plurality of cables that are superposed on one another and that are movable relatively to one another in length directions thereof; and
a line length difference housing case that contains parts of the plurality of cables and that is movable in a reciprocating direction,
wherein the line length difference housing case absorbs differences in line length among the plurality of cables generated in accordance with a moving position of the line length difference housing case.

(2) The cable routing structure according to the aforementioned configuration (1), wherein the line length difference housing case includes:
an insertion port for inserting the plurality of cables into the line length difference housing case; and
a routing portion that arranges the plurality of cables so that the plurality of cables inserted through the insertion port include curved portions having substantially U shape,
wherein the curved portions are arranged in the line length difference housing case so that an opening of the substantially U shape of the curved portions is directed to the insertion port.

(3) The cable routing structure according to the aforementioned configuration (2), wherein the routing portion arranges the plurality of cables so that first parts of the plurality of cables inserted through the insertion port and extending in an insertion direction thereof, second parts of the plurality of cables extending in a direction opposite to the insertion direction, and the curved portions having one ends and other ends, the one ends of the curved portions being connected to one ends of the first parts and the other ends of the curved portions being connected to one ends of the second parts.

(4) The cable routing structure according to the aforementioned configurations (2) or (3), wherein the routing portion has a binding member that binds the plurality of cables.

(5) The cable routing structure according to the aforementioned configuration (2) or (3), wherein a part of one of the plurality of cables which is arranged at most inner side in the curved portion of the plurality of cables is fixed to the insertion port of the line length difference housing case.

(6) The cable routing structure according to any one of the aforementioned configurations (1) to (5), further including:
a winding unit that takes up the plurality of cables,
wherein the line length difference housing case contains a part of the plurality of cables drawn out from the winding unit.

(7) The cable routing structure according to the aforementioned configuration (6), wherein the line length difference housing case contains end parts of the plurality of cables drawn out from the winding unit.

(8) The cable routing structure according to any one of the aforementioned configurations (2) to (5), wherein the routing portion includes a shape holding member having a curved face along the curved portions and located at an inner circumferential side of the curved portions.

(9) The cable routing structure according to any one of the aforementioned configurations (1) to (8), wherein the plurality of cables are flat cables.

(10) The cable routing structure according to any one of the aforementioned configurations (1) to (9), further including:
a protective member that covers outer circumferences of the plurality of cables collectively.

(11) The cable routing structure according to any one of the aforementioned configurations (1) to (11), wherein the line length difference housing case has a retaining portion configured to retain to a connection target to be movable together with the line length difference housing case.

(12) The cable routing structure according to any one of the aforementioned configurations (1) to (11), wherein the line length difference housing case is integrally formed with a connection target to be movable together with the line length difference housing case.

According to the cable routing structure having any one of the aforementioned configurations (1) to (5), differences in line length among the cables can be absorbed in the line length difference housing case even if the differences in line length occur among the cables. It is therefore possible to suppress a problem that the cables may be loosened thereby contacting with a peripheral structure.

According to the cable routing structure having the aforementioned configurations (6) or (7), the cables are separated from one another when the cables are taken up by the winding unit. Thus, differences in line length among the cables drawn out from the winding unit can be absorbed in the line length difference housing case even if the differences in line length occur among the cables. It is therefore possible to suppress a problem that the cables drawn out from the winding unit may be loosened thereby contacting with a peripheral structure, while it is possible to make the cables follow a moving body where the connection target is placed, so that the cables can be fed out and taken up smoothly.

According to the cable routing structure having any one of the aforementioned configurations (2) to (5), the cables are separated from one another by the curved portions formed in the line length difference housing case, so that differences in line length among the cables can be absorbed even if the differences in line length occur among the cables.

According to the cable routing structure having the aforementioned configuration (9), when a plurality of flat cables which are typically used for feeding electric power to a feeding target apparatus belonging to a moving body are placed on one another in use, differences in line length among the flat cables can be absorbed in the line length difference housing case even if the differences in line length occur among the flat cables. It is therefore possible to suppress a problem that the flat cables may be loosened thereby contacting with a peripheral structure.

According to the cable routing structure having any one of the aforementioned configurations (2) to (5) and (8), curved shapes of the curbed portions of the cables in the line length difference housing case are retained so that the curved portions can keep a function of absorbing differences in line length among the cables.

According to the cable routing structure having the aforementioned configuration (10), interference on the cables caused by contact with a peripheral structure can be more surely by the protective member.

According to the invention, it is possible to provide a cable routing structure capable of suppressing loosening of cables, and capable of making the cables follow a moving body to thereby feed out and take up the cables smoothly.

The invention has been described briefly above. The further details of the invention will be made clearer if the following Mode for Carrying Out the Invention (hereinafter referred to as "embodiment") is read through with reference to the accompanying drawings.

BRIEF DESCRIPTION OF THE DRAWINGS

FIGS. 6A and 6B are views showing slide protectors provided with shape holding members respectively, wherein FIG. 6A and FIG. 6B are schematic plan views of the slide protectors respectively.

FIGS. 7A and 7B are views showing protective members attached to flat cables respectively, wherein

DETAILED DESCRIPTION OF THE EXEMPLARY EMBODIMENTS

Embodiments related to the invention will be described below with reference to the drawings.

Figure 1:
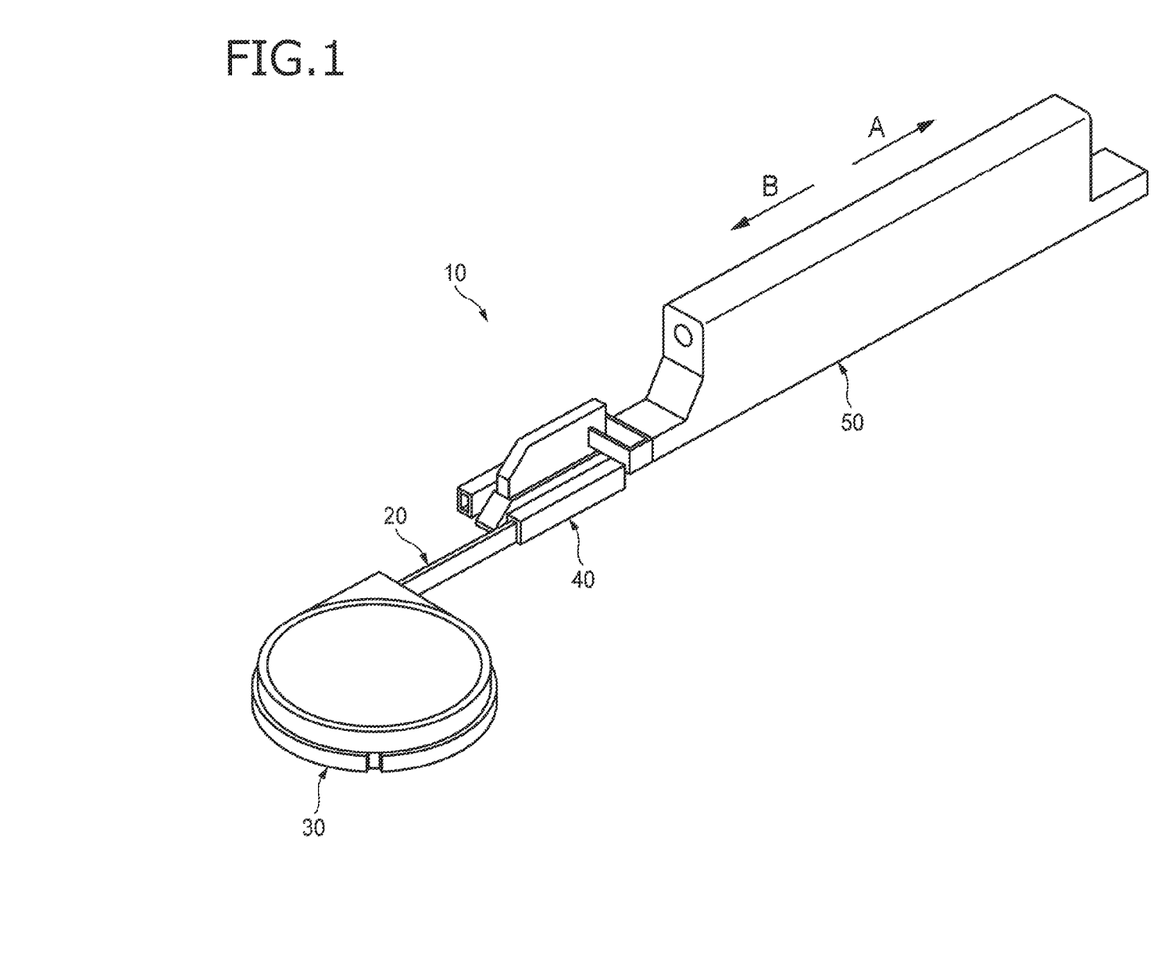
FIG. 1 is a perspective view showing a cable routing structure according to an embodiment of the invention.

FIG. 1 is a perspective view showing a cable routing structure according to the embodiment.

As shown in FIG. 1, the cable routing structure according to the embodiment has a power feeding unit 10. The power feeding unit 10 includes a plurality of flat cables 20, a winding unit 30, and a slide protector 40. Incidentally, in the embodiment, a line length difference housing case 41 which will be described later is formed in the slide protector 40.

In the power feeding unit 10, the slide protector 40 is fixed to a feeding target apparatus 50. The feeding target apparatus 50 is provided in a moving body of a vehicle such as a car. The moving body is, for example, a slide seat, a slide door or the like, which is provided in the vehicle slidably in a front/rear direction. The feeding target apparatus 50 is an electronic apparatus such as a seat sensor or a seat belt sensor provided in the slide seat or an electronic apparatus such as a window opening/closing drive motor or a courtesy lamp provided in the slide door. The feeding target apparatus 50 is reciprocated in the front/rear direction (the arrow A/B direction in FIG. 1) of the vehicle in accordance with sliding of the moving body. A control signal can be transmitted from a vehicle-body-side control unit to the feeding target apparatus 50 through the flat cables 20 of the power feeding unit 10, and electric power can be fed to the feeding target apparatus 50 through the flat cables 20.

Each flat cable 20 is, for example, a cable having a cross-sectional flat shape. In the flat cable 20, a plurality of conductors arranged in parallel have been coated with synthetic resin. The flat cable 20 can be folded in a surface direction thereof. A plurality of such flat cables 20 are put on one another and bundled. In the embodiment, three flat cables 20A, 20B and 20C are superposed on one another and bundled. Each flat cable 20A, 20B, 20C is disposed to direct its width direction to a vertical direction.

Figure 2:
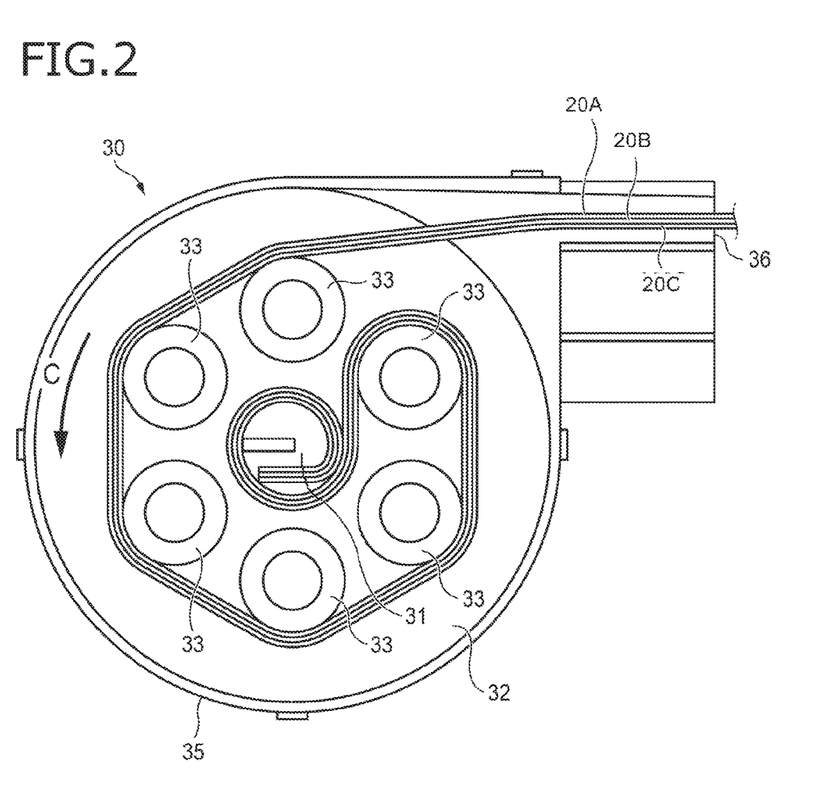
FIG. 2 is a schematic plan view for explaining a configuration of a winding unit.

FIG. 2 is a schematic view for explaining a configuration of the winding unit.

As shown in FIG. 2, the winding unit 30 has a central shaft portion 31, a rotor 32, a plurality of rollers 33, and an urging unit (not shown) such as a spring. End portions of the flat cables 20A, 20B and 20C placed on one another are fixed to the central shaft portion 31. The rotor 32 is rotatably provided around the central shaft portion 31. The rollers 33 are rotatably disposed on the rotor 32 and around the central shaft portion 31. The urging unit urges the rotor 32 in one winding direction C. The central shaft portion 31, the rotor 32, the rollers 33 and the urging unit are housed in a housing case 35. A cable extraction port 36 is formed at a circumferential place of the housing case 35. The flat cables 20A, 20B and 20C are drawn out from the cable extraction port 36.

In the winding unit 30, the rotor 32 is rotated by the urging unit so that the flat cables 20A, 20B and 20C can be wound and taken up along the rollers 33 and in a winding direction C (counterclockwise in the embodiment). Thus, the flat cables 20A, 20B and 20C are drawn into the housing case 35 through the cable extraction port 36 and housed in the housing case 35. On the other hand, when the flat cables 20A, 20B and 20C are pulled out, the rotor 32 is rotated against the urging force of the urging unit and in an opposite direction to the winding direction C. Thus, the flat cables 20A, 20B and 20C which have been taken up along the rollers 33 are fed out from the cable extraction port 36.

Figure 3:
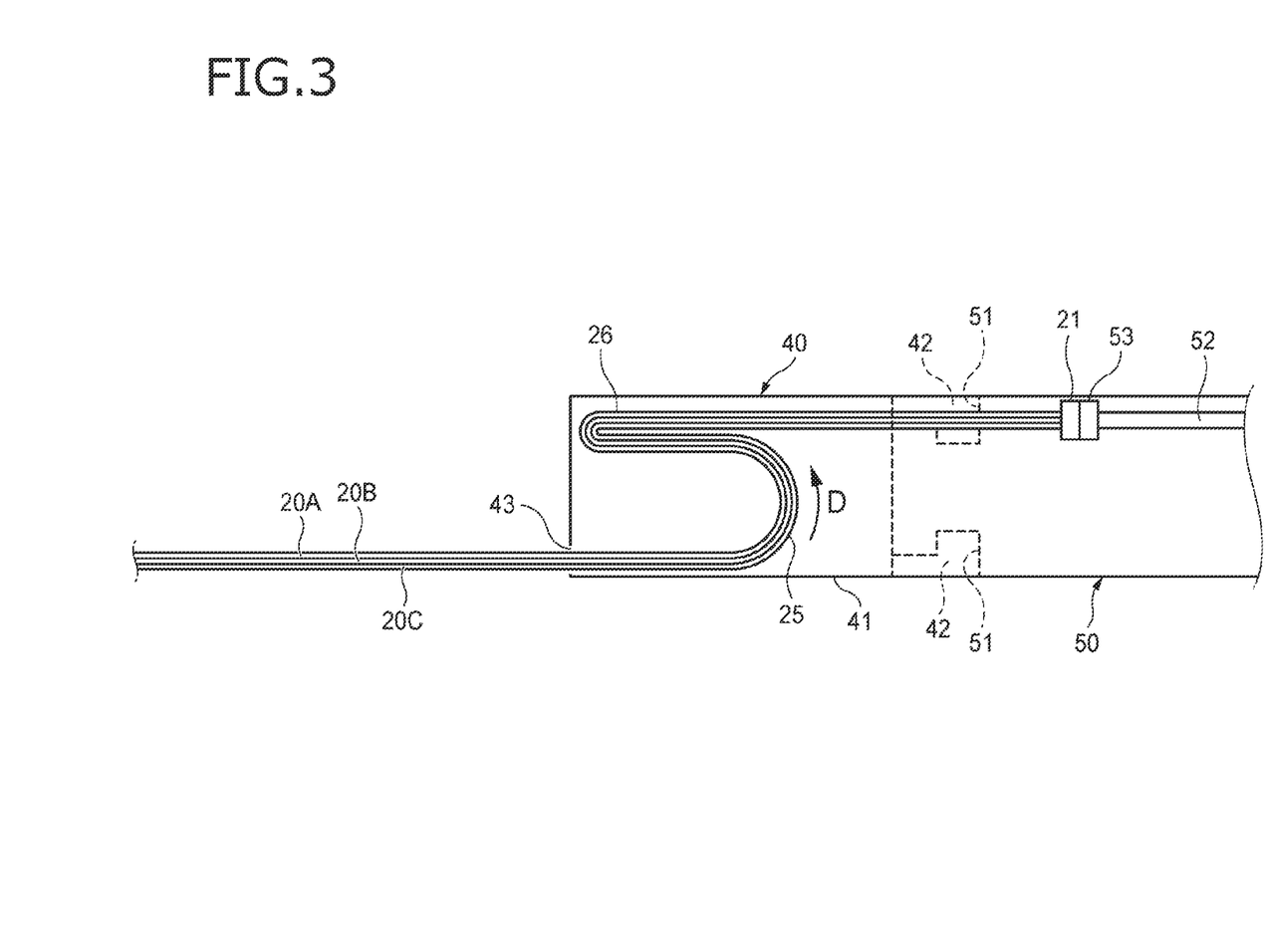
FIG. 3 is a schematic plan view of a slide protector for explaining a configuration of the slide protector.

FIG. 3 is a schematic plan view of the slide protector 40 for explaining a configuration of the slide protector 40.

As shown in FIG. 3, the slide protector 40 has a line length difference housing case 41. The line length difference housing case 41 is, for example, formed out of synthetic resin. The line length difference housing case 41 has lock claws 42 on its one end side. When the lock claws 42 of the line length difference housing case 41 lock a lock recess portions 51 of the feeding target apparatus 50, the slide protector 40 can be coupled and fixed to the feeding target apparatus 50. Thus, the slide protector 40 can move together with the feeding target apparatus 50 in accordance with movement of the moving body.

The line length difference housing case 41 of the slide protector 40 has a cable insertion port 43 on the other end side. The flat cables 20A, 20B and 20C are drawn into the slide protector 40 through the cable insertion port 43. The flat cables 20A, 20B and 20C drawn into the slide protector 40 are introduced into the feeding target apparatus 50 from the coupling side of the line length difference housing case 41 with the feeding target apparatus 50. Connectors 21 are provided at end portions of the flat cables 20A, 20B and 20C. The connectors 21 are connected to connectors 53 of wires 52 of the feeding target apparatus 50. Thus, the flat cables 20A, 20B and 20C are connected to the wires 52 of the feeding target apparatus 50.

The line length difference housing case 41 of the slide protector 40 contains parts of the flat cables 20A, 20B and 20C which occur differences in line length of the flat cables 20A, 20B and 20C. In the line length difference housing case 41, the flat cables 20A, 20B and 20C drawn into the line length difference housing case 41 through the cable insertion port 43 are curved and extended in a direction opposite to the drawing direction of the flat cables 20A, 20B and 20C inserted from the cable insertion port 43, and further folded in the drawing direction. The parts of the flat cables 20A, 20B and 20C curved in the line length difference housing case 41 are formed as curved portions 25, and the parts of the flat cables 20A, 20B and 20C folded in the line length difference housing case 41 are formed as folded portions 26. The curved direction of the curved portion 25 in each of the flat cables 20A, 20B and 20C is set in a direction D (counterclockwise) corresponding to the winding direction C (counterclockwise) in the winding unit 30. In addition, the flat cable 20A among the flat cables 20A, 20B and 20C drawn into the line length difference housing case 41 is located in the outermost circumference at the winding unit 30 when the flat cables 20A, 20B and 20C are taken up by the winding unit 30, and the flat cable 20A is fixed to the cable insertion port 43.

Next, description will be made about operation of the cable routing structure configured thus.

Figure 5:
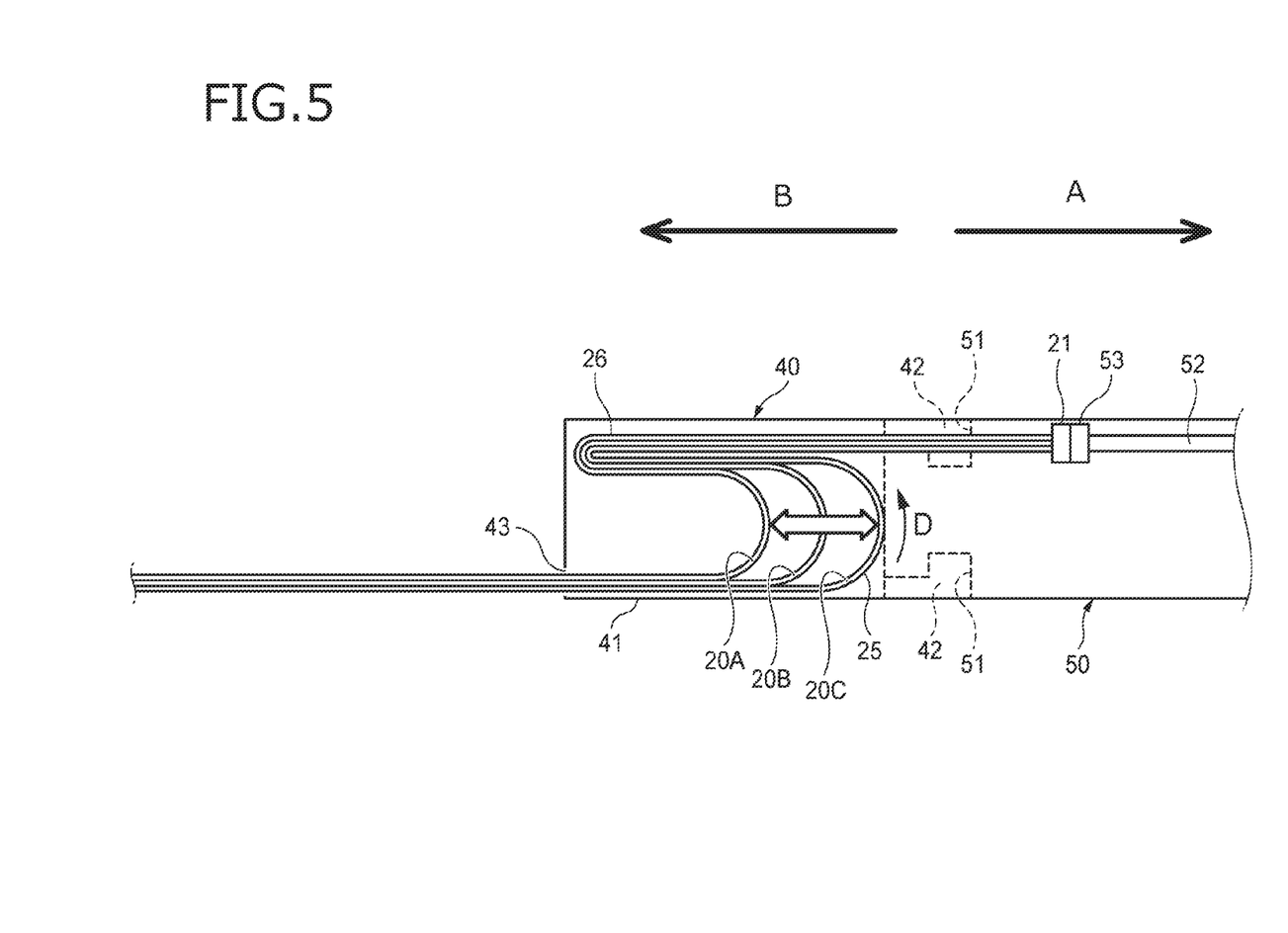
FIG. 5 is a schematic plan view of the slide protector for explaining motions of flat cables in the slide protector.

FIG. 5 is a schematic plan view of the slide protector for explaining motions of the flat cables in the slide protector.

When the moving body moves in a feeding-out direction (the arrow A direction in FIG. 4), the slide protector 40 moves in the feeding-out direction (the arrow A direction in FIG. 4) together with the feeding target apparatus 50 in accordance with the movement of the moving body. Thus, the flat cables 20A, 20B and 20C that have been taken up by the winding unit 30 are fed out from the cable extraction port 36 of the winding unit 30.

When the moving body moves in a taking-up direction (the arrow B direction in FIG. 4) in this state, the slide protector 40 moves in the taking-up direction (the arrow B direction in FIG. 4) together with the feeding target apparatus 50 in accordance with the movement of the moving body. Thus, in the winding unit 30, the rotor 32 is rotated in the counterclockwise winding direction C by the urging unit so that the flat cables 20A, 20B and 20C can be wound and taken up along the rollers 33 and in the winding direction C. As a result, the flat cables 20A, 20B and 20C are drawn into the housing case 35 through the cable extraction port 36 and housed in the housing case 35.

Figure 4:
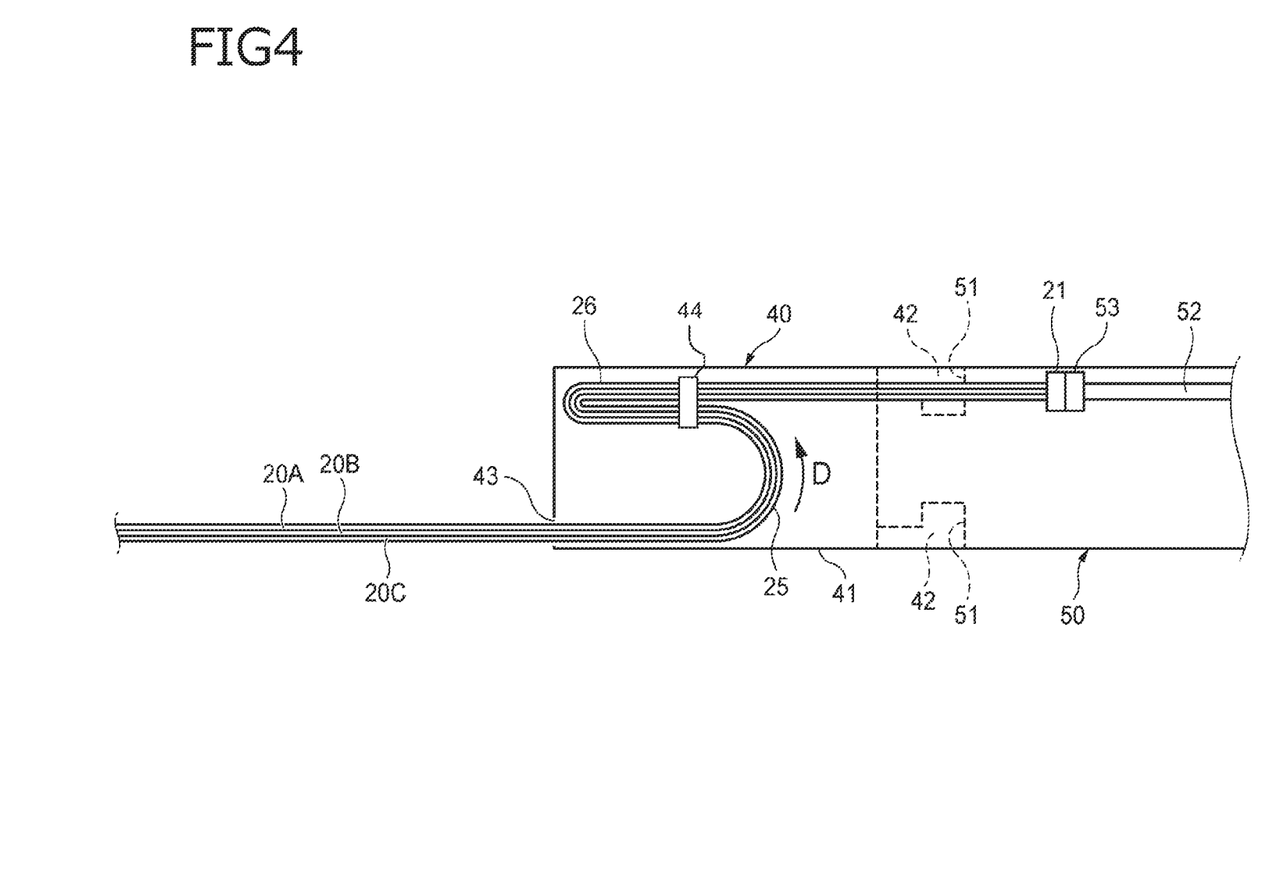
FIG. 4 is a schematic plan view of a slide protector for explaining a configuration of the slide protector having a binding band.

At that time, the inner one (the flat cable C), of the flat cables 20A, 20B and 20C wound along the rollers 33, is set in a more straight shape between adjacent ones of the rollers 33 while more loosening occurs in the outer one (the flat cable 20A) of the flat cables 20A, 20B and 20C. Specifically, between adjacent ones of the rollers 33, the flat cable 20B is loosened outward relatively to the flat cable 20C, and the flat cable 20A is further loosened outward more largely relative to the flat cable 20C. Thus, differences in line length occur among the flat cables 20A, 20B and 20C drawn out from the cable extraction port 36 of the winding unit 30. Specifically, the extraction length of the flat cable 20B is longer than the extraction length of the flat cable 20A, and the extraction length of the flat cable 20C is longer than the extraction length of the flat cable 20B.

As a result, in the slide protector 40, the flat cables 20B and 20C longer in extraction length than the flat cable 20A are put into the line length difference housing case 41 more deeply by their surplus lengths respectively. In the line length difference housing case 41, as shown in FIG. 5, the flat cable 20B leaves the flat cable 20A in their curved portions 25, and further the flat cable 20C leaves the flat cable 20B in their curved portions 25. Accordingly, the differences in line length among the flat cables 20A, 20B and 20C are absorbed in the line length difference housing case 41 of the slide protector 40. Thus, occurrence of loosening can be suppressed between the winding unit 30 and the slide protector 40.

As has been described above, according to the cable routing structure of the embodiment, even if differences in line length occur among the flat cables 20A, 20B and 20C drawn out from the winding unit 30 when the flat cables 20A, 20B and 20C are taken up by the winding unit 30, the flat cables 20A, 20B and 20C are separated from one another in their curved portions 25 in the line length difference housing case 41 of the slide protector 40. Thus, the differences in line length can be absorbed.

It is therefore possible to suppress a problem that the flat cables 20A, 20B and 20C drawn out from the winding unit 30 may be loosened to be interference due to contact with a peripheral structure, while it is possible to make the flat cables 20A, 20B and 20C follow the moving body so that the flat cables 20A, 20B and 20C can be fed out and taken up smoothly.

Incidentally, in the slide protector 40, it is an example that, parts of the flat cables 20A, 20B and 20C between the folded portions 26 and the curved portion 25 are bundled by a binding band 44 or retained by a hook portion (not shown) and so on. When the parts between the folded portions 26 and the curved portion 25 are bundled by the binding band 44 or retained by the hook portion, the curved shapes of the curved portions 25 can be shaped easily. Also, as an alternative example, the curved shapes of the curved portions 25 are shaped by restoration property of each sheath cover of the flat cables 20A, 20B and 20C.

Figure 6A:
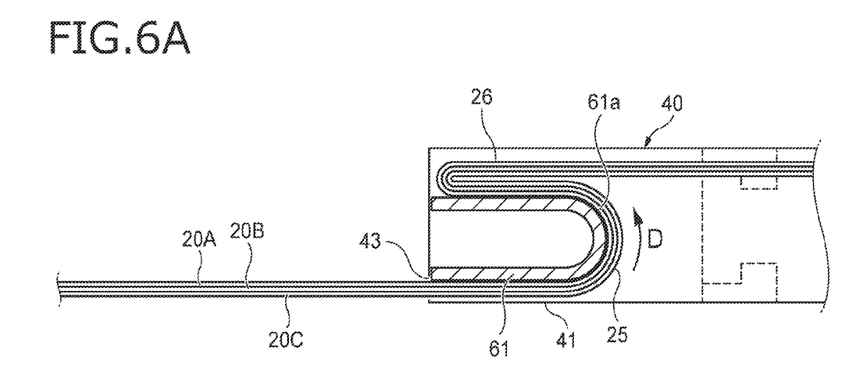
Figure 6B:
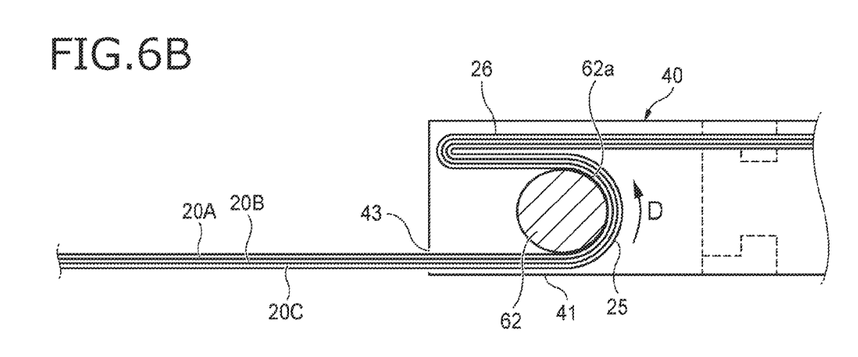

In addition, in order to retain the curved shapes on the inner circumferential side of the curved portions 25, a shape holding member 61 having a U-shape and a curved face 61a may be disposed on the inner circumferential side of the curved portions 25 as shown in FIG. 6A, or a shape holding member 62 having a column shape and a curved face 62a in its outer circumferential surface may be disposed on the inner circumferential side of the curved portions 25.

When the shape holding member 61 or 62 is provided in the line length difference housing case 41, the curved shapes of the curved portions 25 of the flat cables 20A, 20B and 20C in the line length difference housing case 41 can be retained to keep the absorb function in which the differences in line length among the flat cables 20A, 20B and 20C can be absorbed by the curved portions 25.

In addition, it is an example that a protective member for protecting the flat cables 20A, 20B and 20C is provided between the winding unit 30 and the slide protector 40.

Figure 7A:
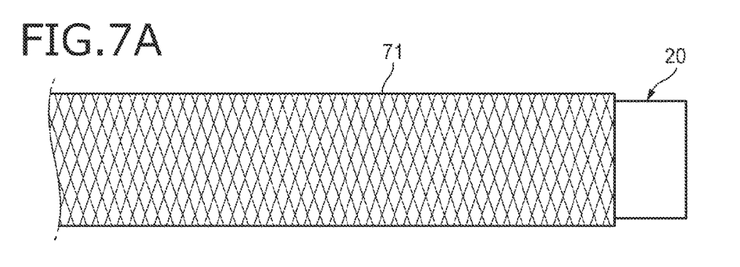
FIG. 7A is a side view of flat cables attached with a protective member.
Figure 7B:
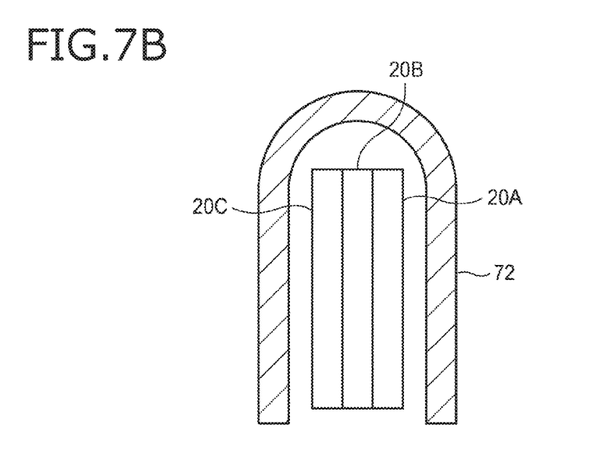
FIG. 7B is a schematic sectional view of flat cables attached with another protective member.

For example, the flat cables 20A, 20B and 20C between the winding unit 30 and the slide protector 40 are inserted into a protective member 71 made of a braided sleeve so that the outer circumferences of the flat cables 20A, 20B and 20C can be collectively covered with and protected by the protective member 71 as shown in FIG. 7A, or the flat cables 20A, 20B and 20C between the winding unit 30 and the slide protector 40 are collectively covered with and protected by a flexible protective member 72 made of resin and having a U-shape in sectional view as shown in FIG. 7B. As for the protective member 71 made of the braided sleeve, for example, fiber made of synthetic resin such as plastic, nylon or polyethylene terephthalate (PET) may be braided. The U-shaped protective member 72 may be, for example, formed out of rubber or the like. Incidentally, the flat cables 20A, 20B and 20C are displaced relatively to one another in their longitudinal directions, and the flat cables 20B and 20C are inserted into and removed from the line length difference housing case 41 of the slide protector 40. Accordingly, it is desired to fix the protective member 71 or 72 to the flat cable 20A fixed to the cable insertion port 43 of the slide protector 40.

When the protective member 71 or 72 collectively covering the flat cables 20A, 20B and 20C drawn out from the winding unit 30 is attached to the flat cables 20A, 20B and 20C in this manner, it is possible to more surely suppress the flat cables 20A, 20B and 20C from the contact with a peripheral structure.

Next, a modification of the slide protector will be described.

Incidentally, constituent parts the same as those in the aforementioned embodiment are referenced correspondingly, and their description will be omitted.

Figure 8:
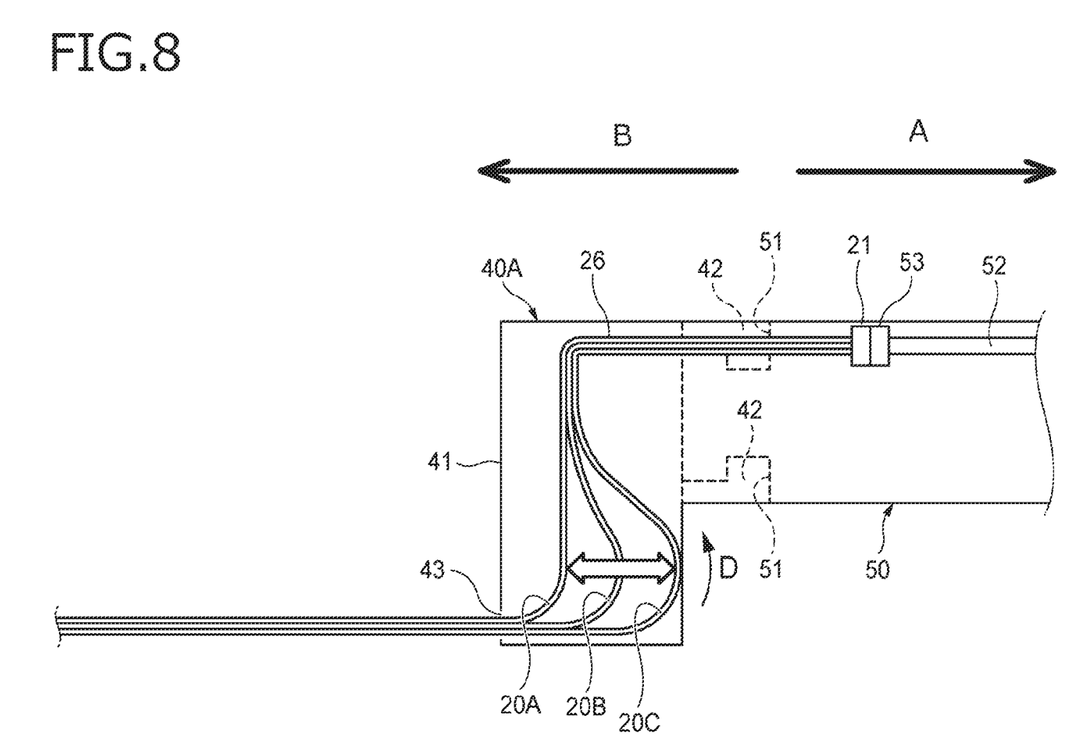
FIG. 8 is a schematic plan view of a slide protector according to a modification.

FIG. 8 is a schematic plan view of the slide protector according to the modification.

As shown in FIG. 8, a slide protector 40A according to the modification is disposed in a direction crossing the moving direction (the arrow A/B direction in FIG. 7) of the feeding target apparatus 50 in which the line length difference housing case 41 moves together with the moving body. In the slide protector 40A, a cable insertion port 43 is provided on an opposite end portion side to the connection side with the feeding target apparatus 50.

Of the flat cables 20A, 20B and 20C drawn into the line length difference housing case 41 through the cable insertion port 43, parts curved in a direction perpendicular to the drawing direction from the cable insertion port 43 are set as curved portions 25 in the line length difference housing case 41, and further parts folded in the drawing direction are set as folded portions 26. The curved direction of the curved portion 25 in each of the flat cables 20A, 20B and 20C in the line length difference housing case 41 is set in a direction D (counterclockwise) corresponding to the winding direction C (counterclockwise) in the winding unit 30. The folded portions 26 are bundled by a binding band 44 as shown in FIG. 4. In addition, the flat cable 20A among the flat cables 20A, 20B and 20C drawn into the line length difference housing case 41 is located in the outermost circumference at the winding unit 30 when the flat cables 20A, 20B and 20C are taken up by the winding unit 30, and the flat cable 20A is fixed to the cable insertion port 43.

Also in the slide protector 40A according to the modification, the flat cables 20B and 20C longer in extraction length than the flat cable 20A are put into the line length difference housing case 41 more deeply by their surplus lengths respectively when the flat cables 20A, 20B and 20C are taken up by the winding unit 30. In the line length difference housing case 41, the flat cable 20B leaves the flat cable 20A in their curved portions 25, and further the flat cable 20C leaves the flat cable 20B in their curved portions 25. Accordingly, the differences in line length among the flat cables 20A, 20B and 20C are absorbed in the line length difference housing case 41 of the slide protector 40A. Thus, occurrence of loosening can be suppressed between the winding unit 30 and the slide protector 40A.

Although the width dimension can be suppressed in the aforementioned slide protector 40, the length dimension can be suppressed in the slide protector 40A according to the modification.

Figure 9:
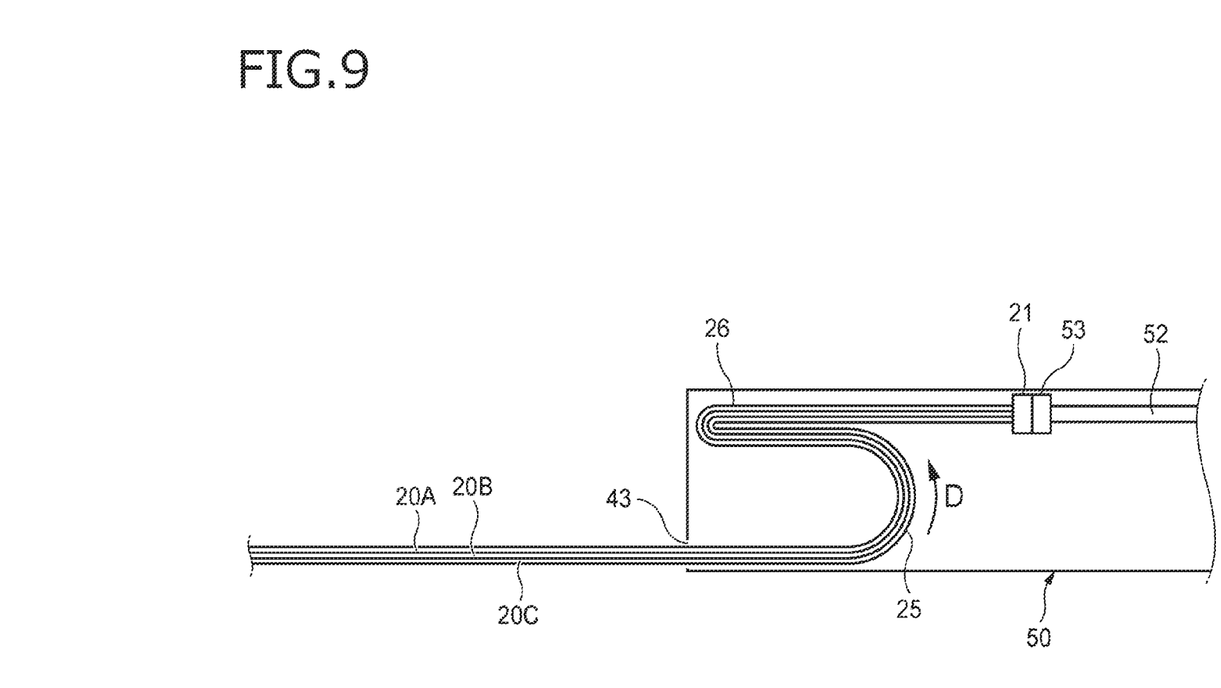
FIG. 9 is a schematic plan view of a feeding target apparatus provided with a line length difference housing case.

Incidentally, although the case where the line length difference housing case 41 is formed in the slide protector 40 or 40A has been described above, a line length difference housing case may be integrally formed in the feeding target apparatus 50 as shown in FIG. 9.

Incidentally, the invention is not limited to the aforementioned embodiment, but deformations, improvements, etc. can be made suitably. In addition, materials, shapes, dimensions, numbers, arrangement places, etc. of respective constituent elements in the aforementioned embodiment are not limited. Any materials, any shapes, any dimensions, any numbers, any arrangement places, etc. may be used as long as the invention can be attained.

Here, the features of the aforementioned embodiment of the cable routing structure according to the invention will be summarized and listed briefly in the following paragraphs [1] to [12].

[1] A cable routing structure including:
    a plurality of cables (flat cables 20A, 20B and 20C) that are superposed on one another and are movable relatively to one another in length directions thereof; and a line length difference housing case (41) that contains parts of the plurality of cables (flat cables 20A, 20B and 20C) and is movable in a reciprocating direction,
  wherein the line length difference housing case (41) absorbs differences in line length among the plurality of cables (flat cables 20A, 20B and 20C) generated in accordance with a moving position of the line length difference housing case (41).
[2] The cable routing structure according to the item [1], wherein the line length difference housing case (41) includes:
  an insertion port (43) for inserting the plurality of cables (flat cables 20A, 20B and 20C) into the line length difference housing case (41); and
  a routing portion (44, 61 or 62) that arranges the plurality of cables (flat cables 20A, 20B and 20C) so that the plurality of cables (flat cables 20A, 20B and 20C) inserted through the insertion port (43) include curved portions (25) having substantially U shape,
  wherein the curved portions (25) are arranged in the line length difference housing case (41) so that an opening of the substantially U shape of the curved portions (25) is directed to the insertion port (43).
[3] The cable routing structure according to the item [2], wherein the routing portion (44, 61 or 62) arranges the plurality of cables (flat cables 20A, 20B and 20C) so that first parts of the plurality of cables (flat cables 20A, 20B and 20C) inserted through the insertion port (43) and extending in an insertion direction thereof, second parts of the plurality of cables (flat cables 20A, 20B and 20C) extending in a direction opposite to the insertion direction, and the curved portions (25) having one ends and other ends, the one ends of the curved portions (25) being connected to one ends of the first parts and the other ends of the curved portions (25) being connected to one ends of the second parts.
[4] The cable routing structure according to the items [2] or [3], wherein the routing portion (44, 61 or 62) has a binding member (44) that binds the plurality of cables (flat cables 20A, 20B and 20C).
[5] The cable routing structure according to the item [2] or [3], wherein a part of one of the plurality of cables (flat cables 20A, 20B and 20C) which is arranged at most inner side in the curved portion (25) of the plurality of cables (flat cables 20A, 20B and 20C) is fixed to the insertion port (43) of the line length difference housing case (41).
[6] The cable routing structure according to any one of the items [1] to [5], further including:
  a winding unit (30) that takes up the plurality of cables (flat cables 20A, 20B and 20C),
  wherein the line length difference housing case (41) contains a part of the plurality of cables (flat cables 20A, 20B and 20C) drawn out from the winding unit (30).
[7] The cable routing structure according to the item [6], wherein the line length difference housing case (41) contains end parts of the plurality of cables (flat cables 20A, 20B and 20C) drawn out from the winding unit (30).
[8] The cable routing structure according to any one of the items [2] to [5], wherein the routing portion includes a shape holding member (61 or 62) having a curved face (61a or 62a) along the curved portions (25) and located at an inner circumferential side of the curved portions (25).
[9] The cable routing structure according to any one of the items [1] to [8], wherein the plurality of cables (flat cables 20A, 20B and 20C) are flat cables.
[10] The cable routing structure according to any one of the items [1] to [9], further including:
  a protective member (71 or 72) that covers outer circumferences of the plurality of cables (flat cables 20A, 20B and 20C) collectively.
[11] The cable routing structure according to any one of the items [1] to [11], wherein the line length difference housing case (41) has a retaining portion configured to retain to a connection target (feeding target apparatus 50) to be movable together with the line length difference housing case (41).
[12] The cable routing structure according to any one of the items [1] to [11], wherein the line length difference housing case (41) is integrally formed with a connection target (feeding target apparatus 50) to be movable together with the line length difference housing case (41).

What is claimed is:
1. A cable routing structure comprising:
  a plurality of cables that are superposed on one another and that are movable relatively to one another in length directions thereof; and
  a line length difference housing case that contains parts of the plurality of cables and that is movable in a reciprocating direction,
  wherein the line length difference housing case absorbs differences in line length among the plurality of cables generated in accordance with a moving position of the line length difference housing case,
  wherein the line length difference housing case comprises:
    an insertion port for inserting the plurality of cables into the line length difference housing case; and
    a routing portion that arranges the plurality of cables so that the plurality of cables inserted through the insertion port include curved portions having substantially U shape and folded portions,
  wherein the curved portions are arranged in the line length difference housing case so that an opening of the substantially U shape of the curved portions is directed to the insertion port, and
  wherein the routing portion arranges the plurality of cables so that first parts of the plurality of cables inserted through the insertion port and extending in an insertion direction thereof, second parts of the plurality of cables extending in a direction opposite to the insertion direction, the curved portions having one ends and other ends, the one ends of the curved portions being connected to one ends of the first parts and the other ends of the curved portions being connected to one ends of the second parts, third parts of the plurality of cables extending in the insertion direction, and the folded portion have one ends and other ends, the one ends of the folded portions being connected to other ends of the second parts and the other ends of the folded portions being connected to one ends of the third parts.
2. The cable routing structure according to claim 1, wherein the routing portion has a binding member that binds the plurality of cables.
3. The cable routing structure according to claim 1, wherein a part of one of the plurality of cables which is arranged at most inner side in the curved portion of the plurality of cables is fixed to the insertion port of the line length difference housing case.
4. The cable routing structure according to claim 1, further comprising:
  a winding unit that takes up the plurality of cables, wherein the line length difference housing case contains a part of the plurality of cables drawn out from the winding unit.

5. The cable routing structure according to claim 4, wherein the line length difference housing case contains end parts of the plurality of cables drawn out from the winding unit, the end parts of the plurality of cables including the first parts, the second parts, and the third parts.

6. The cable routing structure according to claim 1, wherein the routing portion includes a shape holding member having a curved face along the curved portions and located at an inner circumferential side of the curved portions.

7. The cable routing structure according to claim 1, wherein the plurality of cables are flat cables.

8. The cable routing structure according to claim 1, further comprising:
a protective member that covers outer circumferences of the plurality of cables collectively.

9. The cable routing structure according to claim 1, wherein the line length difference housing case has a retaining portion configured to retain to a connection target to be movable together with the line length difference housing case.

10. The cable routing structure according to claim 1, wherein the line length difference housing case is integrally formed with a connection target to be movable together with the line length difference housing case.

11. The cable routing structure according to claim 1, wherein the reciprocating direction is substantially parallel with the insertion direction.

* * * * *